June 25, 1929.　　W. H. MILLSPAUGH　　1,718,574
PAPER MAKING METHOD AND MACHINE
Filed May 11, 1925　　2 Sheets-Sheet 1

Inventor
William H. Millspaugh
By Dowell & Dowell
his Attorneys

Patented June 25, 1929.

1,718,574

UNITED STATES PATENT OFFICE.

WILLIAM H. MILLSPAUGH, OF SANDUSKY, OHIO.

PAPER-MAKING METHOD AND MACHINE.

Application filed May 11, 1925. Serial No. 29,600.

This invention relates to paper making, and among other objects is intended to provide an improved method and machine for use in the manufacture of laminated or plural-ply paper.

The invention will be understood by reference to the annexed drawings showing for illustration certain apparatus embodying and for use in practicing methods embodying the invention.

In said drawings:

Fig. 1ª is a plan view of a part of the machine showing the screw agitators.

Figure 1:
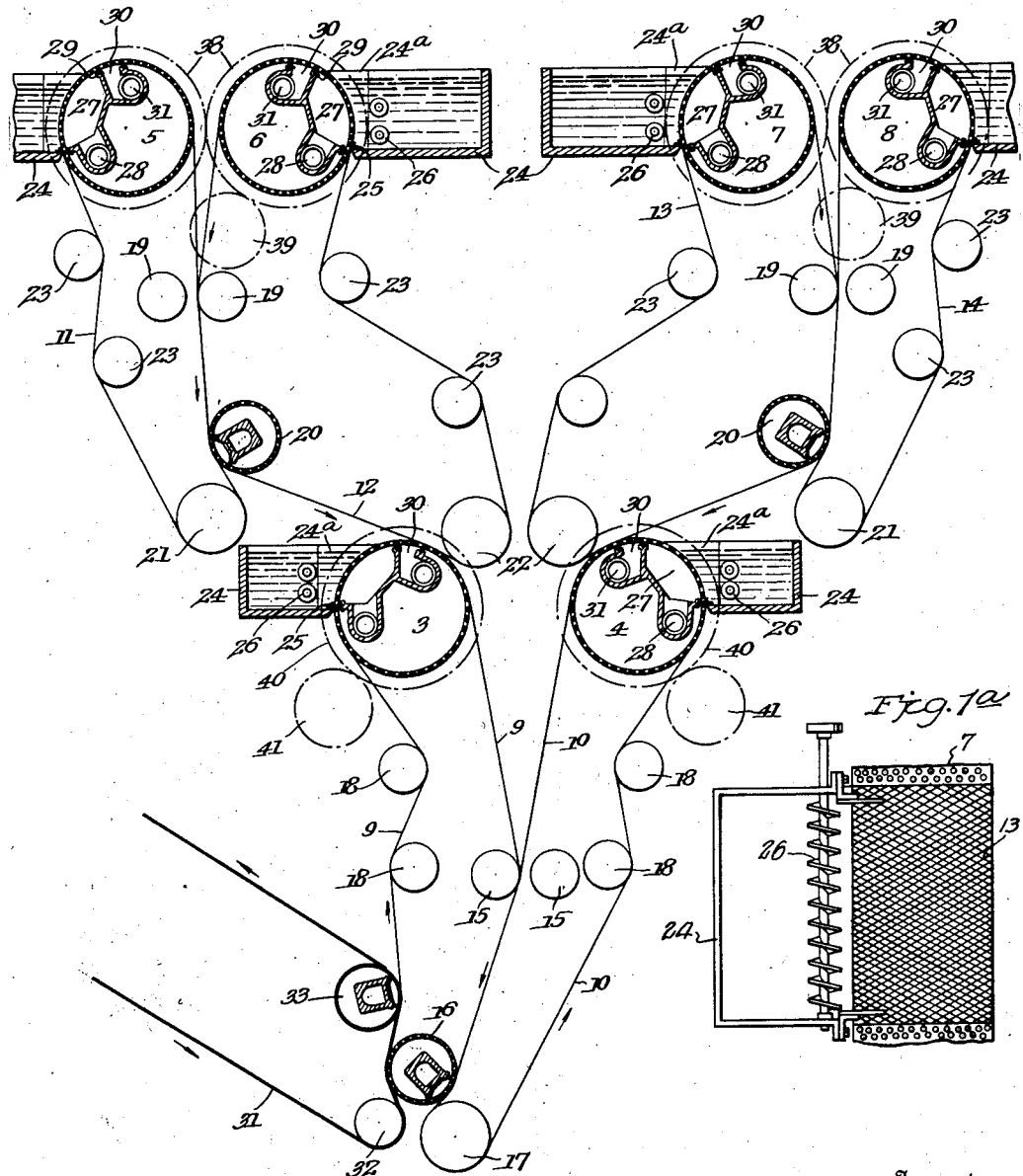
Fig. 1 is a sectional elevation (substantially diagrammatic) of a machine for use in the production of paper of as many as six plies.
Figure 2:
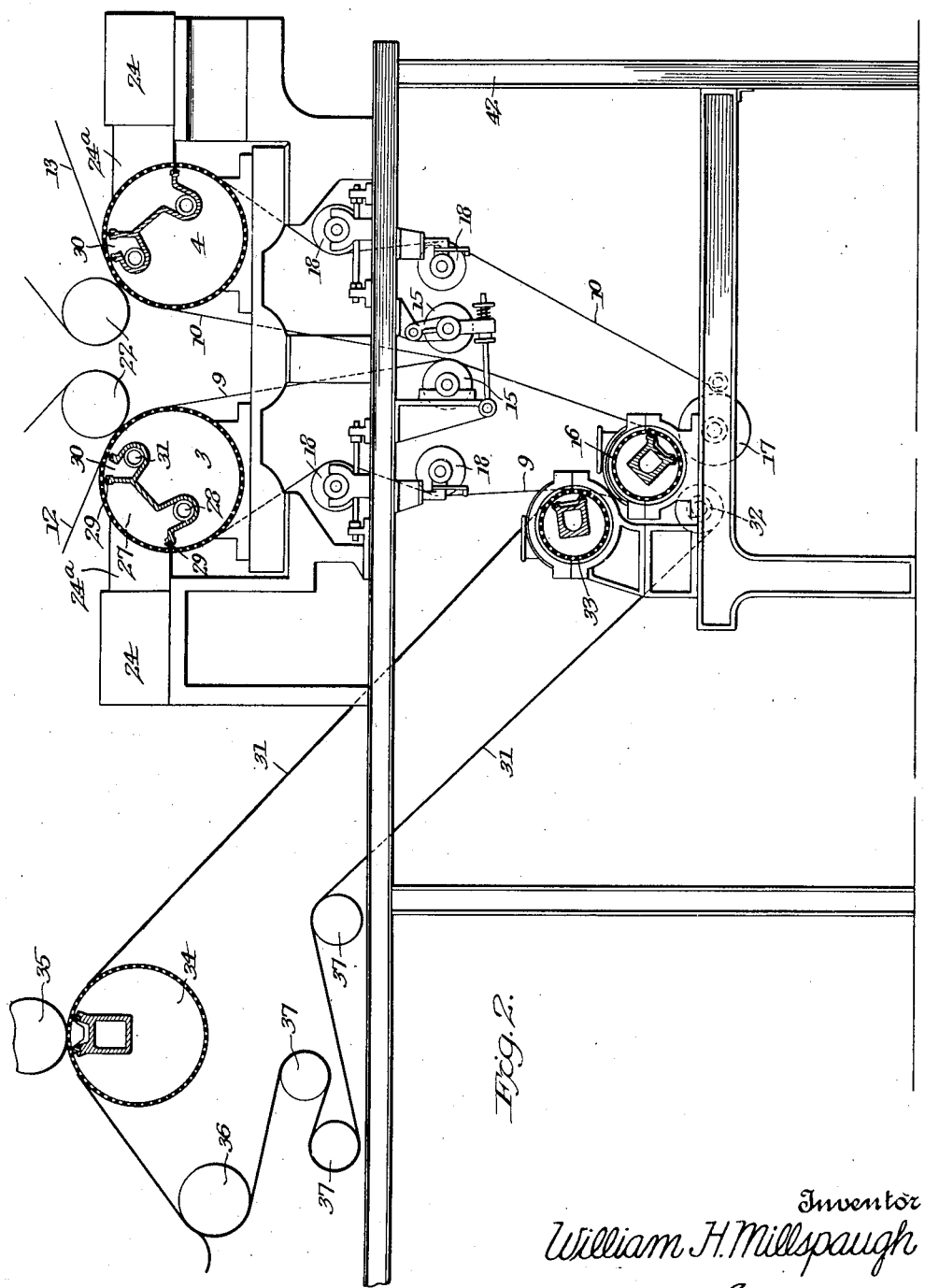
Fig. 2 is a side elevation with parts in section of the lower part of the machine shown in Fig. 1, including the two lower sheet-forming apparatus thereof.

Fig. 2 may be considered as representing a machine for making duplex or two-ply paper and to which additional equipment may be applied to provide a machine such as shown in Fig. 1 for the production of multiply paper.

For the purposes of this description Figs. 1 and 2 will be treated as conjointly illustrating one machine, which will now be described in connection with a method of producing plural-ply paper by vacuum-induced formation of the plies under highly desirable conditions, it being understood that the following description is specifically with reference to the illustrative embodiments of the invention shown in the drawings and is not intended as limiting or restricting the invention which is particularly pointed out and defined in the claims at the end of this description.

In the drawings, the numerals 3, 4, 5, 6, 7 and 8 denote the rotating perforated cylinders of a number of suction rolls of any approved construction for maintenance of vacuum action on desired cylindric areas. Said cylinders may be mounted and driven by any appropriate means as will be understood by those familiar with the suction roll art. All or any number of these suction rolls may be simultaneously employed for making continuous wet paper sheets or plies to be brought together and bonded into a laminated or plural-ply web or sheet.

Endless travelling wire cloths such as ordinary Fourdrinier making wires, typifying any suitable strainer and carrying mediums, are shown entrained upon or about the respective cylinders and driven thereby; such cloths or making wires, hereinafter for convenience mentioned as wires, being respectively designated by the numerals 9, 10, 11, 12, 13 and 14. These wires provide forming surfaces on the cylinders, such as could be provided by cloth-jacketing the cylinders, and serve to convey the sheets from the cylinders to succeeding elements. The cylinders are shown arranged in oppositely rotating pairs, so that their upper surfaces move toward each other; and the wires passing around the respective pairs of cylinders are trained to converge and bring the sheets formed by the respective pairs of cylinders together or in contact with one another. A pair of such cylinders, as 5—6 and 7—8, is shown arranged above each of the cylinders of the pair 3—4, while the wires associated with the upper pairs are arranged to deliver the contacting sheets produced by such pairs onto the respective lower cylinders.

Referring to the lower pair of cylinders 3—4, it will be observed that the converging sheet-carrying runs of their wires 9 and 10, which carry the wet sheets formed or applied on said cylinders into contact, are shown trained against and deflected by one of the squeeze rolls 15, which rolls may or may not be adjusted to exert pressure on the coacting runs of the wires and intervening paper sheets according to particular requirements depending upon the character of paper being made and other conditions. Adjusting means for said squeeze rolls is shown in Fig. 2. From the roll 15 on which the wires are trained, the runs of the wires travel to and partially around or in engagement with a transfer roll 16 which also serves as a bottom guide roll for the wire 9, while the wire 10 is passed around a bottom guide roll 17. Guiding and tensioning rolls 18 are also shown for each of said wires, over which the latter are trained in their respective paths.

The wires associated with each of the upper pairs of cylinders are likewise shown having converging runs to bring the sheets formed on such cylinders into contact, and each pair or set of upper wires, 11—12 and 13—14, is shown trained against and deflected by one of a pair of squeeze rolls 19, which like the aforesaid rolls 15 may be adjusted for pressure when conditions require. The coacting runs of each set of wires 11—12 and 13—14 pass collinearly from the deflecting roll 19 and to and in engagement with a transfer roll 20 serving as a guide roll for one of said wires of each pair while the other wire of each pair is passed around a guide roll 21. Guiding and tensioning rolls for the several upper wires are indicated at 22 and 23.

The wire 12 is shown passing from the roll 20 to and in engagement with the cylinder 3, so that the paper sheets continuously made on the upper cylinders 5 and 6, being brought together or in contact by the wires 11 and 12, and being transferred at the roll 20 to the wire 12, is carried thereby and applied to the wire 9 on the cylinder 3 or to the sheet made on said last mentioned cylinder. Similarly and for like purposes the wire 13 is shown running from its associated transfer roll 20 to and in engagement with the cylinder 4.

Additional forming cylinders may be incorporated in a machine, for instance by superstructural arrangement of such additional cylinders and parts with respect to either or both of the pairs of cylinders 5—6 and 7—8 similarly to the arrangement or organization here shown with respect to the lowermost cylinders 3 and 4, and such arrangement or plan in assembling a machine with a larger number of sheets forming cylinders than are shown in the illustrative machine may be further carried out with respect to successive pairs of cylinders, so as to include any desired number of forming surfaces; such arrangement representing one practicable organization for a multi-cylinder machine cooperating to bring their respective plies or sheets into relationship to form a multiply web.

In the illustrative machine, bodies of liquid pulp or paper-producing liquid stock bear on segments of the cylindrical forming surfaces provided by the wire covered portions of the cylinders 3, 4, 5, 6, 7 and 8. In this instance, liquid stock is supported against the outer side of each cylinder by means of a vat 24 open adjacent to the cylinder and having side walls formed with concave edges conforming to and closely overlying the forming surface thereof. A rubber strip 25 is shown fitted along the bottom edge of each vat, in the angle between said edge and the cylinder surface, so as to lap the surface and assist in preventing leakage of pulp liquid at any point along the edge. Liquid stock is continuously supplied to the vats from a reservoir (not shown), and is maintained at substantially constant levels in each vat by appropriate means such for instance as overflow pipes or other known expedients.

The ends of the vat walls immediately adjacent to the cylindrical forming surfaces may be formed of thin vertical metal plates 24ª affixed as facings or extensions to the main side wall members of the vats, said ends or plates being adjustable laterally for controlling the widths of the cylindrical forming surfaces in contact with liquid stock in accordance with the widths of the sheets to be formed, and the narrow crevices between the cylindrical forming surfaces and the curved edges of said plates may be left open to the atmosphere, the pulp liquid in the vats being held from running out through said crevices by suction or vacuum maintained within the cylinders. The means described represents one practicable mode of applying the liquid stock. For controlling the widths of the suction of vacuum areas or chambers within the forming cylinders correspondingly with the widths of the sheets to be formed, laterally adjustable ends or heads (not shown) may also be provided in the ends of the hereinafter mentioned suction boxes of each of said cylinders.

Agitators 26 may be provided in certain or all of the vats to permit the liquid stock therein bearing on the cylinders to be maintained in constant states of agitation for the purpose of obtaining a criss-cross disposition of the pulp fibers in the process of wet sheet formation and prevent alinement of the fibers in the direction of rotation of the cylinders. The agitators 26 are shown as rotary screws or in the form of spiraled blades disposed parallel with the cylinders and which may be driven by application of power to extremental pulleys or gears fixed on the agitator shafts. A pair of oppositely spiraled agitators is desirably provided for each vat in proximity to the moving cylindrical forming surface, in order effectually to keep the fibers in a state of agitation close thereto as they are drawn upon said surfaces. This mechanism is believed to be excellent for proper agitation of the liquid stock during vacuum-induced paper formation, and allows certain practices useful in various cases.

For maintaining vacuum action on the cylindric forming surfaces in contact with the liquid stock, the several cylinders or suction rolls are shown equipped with interior vacuum chambers 27 opposite the respective liquid columns bearing on the cylinders, such chambers communicating by the pipes 28 with a suitable vacuum pump or pumps or other vacuum-producing apparatus (not shown) capable of maintaining in the chambers suitable vacua to effect vacuum-induced formation of wet sheets of desired thickness on the respective forming surfaces as they traverse the arcs of contact with the liquid stock, while drawing off the large quantities of water from the stock from which the paper forms. A practicable means of providing said vacuum chambers is by employment of stationary suction boxes bearing against and cooperating with the interior surfaces of the cylinders in a well understood manner. Suction box packings in contact with the interior cylinder surfaces are indicated at 29.

In the illustrative machine the cylinders rotate in such directions as to move the strainer cloths or wires providing the sheet-forming surfaces upwardly through the arcs of contact with the liquid stock, and by extending the vacuum chambers 27 to points beyond or above the liquid levels in the vats the sheets while being carried from the liquid will continue to be subjected to vacuum action with advantageous effect in preserving the sheets intact as formed and preventing backwashing of fibres therefrom while also draining moisture from the sheets, the amount of drainage thus effected being dependent upon the extent of prolongation of the forming vacuum areas beyond the liquid levels.

Additional vacuum chambers 30 are shown provided in the cylinders for action on the paper sheets after they leave their respective forming areas; such vacuum chambers 30 in this instance being conveniently provided by suction boxes constructed integrally with or as additional compartments of the suction boxes which provide the vacuum chambers 27. Said chambers 30, which like 27 may be provided with adjustable ends or heads for adjustment to suit the widths of sheet being made, communicate with a vacuum pump or pumps or other vacuum-producing apparatus through the pipes 31. By appropriate vacuum regulators or by control of speed of the vacuum pumps, regulated vacua of proper degree may be maintained in the respective chambers 30 for moisture regulation or tempering the moisture contents of the sheets as desired.

From the foregoing it will be understood that any of the several suction rolls or cylinders of the illustrative machine practices a method of making paper in a continuous sheet by vacuum-induced formation on a cylindric surface to which dilute liquid stock of a character for finished paper production is applied by appropriate means represented for example by the vats and associated plates referred to, the liquid being drawn by vacuum from the stock at such rate and force as to collect continuously on the cylinder in tight or close formation the requisite supply of pulp fibres to form the sheet and to hold the same in formation against backwashing effect of the liquid. Such method as practiced under conditions permissible with the construction shown in the drawings is advantageously characterized in that the forming surfaces provided by the strainer cloths or wires on the cylinders are uninterruptedly or continuously exposed to the forming vacuum action as they traverse the arcs of contact with the liquid and until passing beyond the liquid, so that the wet sheets are substantially formed by substantially the time they emerge from the liquid and are then held intact as formed while also undergoing drainage. A fine formation is thus obtainable and the sheets form substantially uniformly and have a desirable tenacity. Moreover the sheets will form with straight clean-cut edges if the liquid stock on the vacuum areas of the cylinders be laterally confined by the aforesaid thin plates 24$^a$ having concave edges closely overlying but not in contact with the forming surfaces; the liquid being held from escaping at the crevices between said plate edges and forming surface by the atmospheric pressure created by vacuum and the sheets forming on edges defined by the plates.

The amount of vacuum to be maintained in the vacuum chambers of each cylinder will depend upon conditions such as the nature and dilution of stock and character and thickness of product to be produced. By properly adjusting the vacuum in reference to such conditions and the speed of rotation of the cylinder and area of liquid contact, wet sheets of fine formation ranging from thin tissues to comparatively thick sheets may be produced at fast as well as moderate speeds. In the manufacture of laminated or plural-ply paper by a method embodying this invention or features thereof, sheets or plies of the same thickness or unequal thickness may be formed from the same class of stock or from different classes of stock. For instance in the manufacture of laminated newspaper, the plies thereof may be formed from the same stock; while in the production of box board or the like certain plies may be of inferior stock while the outer plies may be of superior stock to form white or manila liners.

If the liquid stock in the vats is left quiet, the sheets will tend to form with the pulp fibres in alinement or disposed in the direction of the rotation of the respective cylinders, which may be desirable for the production of papers or plies of greater tensile strength lengthwise than transversely; but when the agitators 26 are set in motion such alinement or disposition of the fibres under influence of the vacuum will be prevented, as the fibres contiguous to the forming surfaces will be kept in constant motion, causing their induction upon the forming surfaces in criss-cross relation. In this connection, it will be observed that in making a cross-grain laminated or plural-ply paper, the sheets or plies may be formed with the grain of the fibres in alternate merging sheets running at angles or at substantially right angles to each other, the liquid stock bearing on certain of the forming surfaces for such purpose being agitated to move across the forming surface in a given direction, while the stock bearing on certain other of surfaces may be agitated to move in an opposite direction, or may be left quiet. Alternately grained sheets or plies may be formed on any cooperable pair of cylinders, by agitating the stock bearing on the forming surface of one of the pair in a given direction, while agitating the stock bearing on the forming surface of the other in an opposite direction so that the plies may be bonded with the grain of the fibres in one sheet running crosswise or at an angle to the grain in the other. For the production of papers or plies of increased transverse strength, or of equal strength longitudinally and transversely, the liquid stock opposite the vacuum chamber of each cylinder may be maintained in a state of constant agitation, thereby causing the pulp fibres to collect in crosswise disposition.

In the production of duplex or other plural-ply paper, involving the uniting of separate wet sheets or separate formations of paper, the sheets to be united should carry a certain amount of water for bonding purposes, the amount requisite or most advantageous in given cases being dependent upon specific conditions as to the stock and preparation thereof, thickness and character of work, etc., and to some extent upon the treatment to which the merged sheets are to be subjected. Now if the separate sheets or paper formations are left very wet or too wet, as it apt to be the case in the production of plural-ply paper with the ordinary methods commercially used prior to the present invention, then while the sheets will bond easily with the excess water carried yet difficulties or objections will arise through crushing of wet sheets if sufficient pressure be applied to make the perfect bond or union required. On the other hand, if too much water be withdrawn from the paper then the bonding is likely to be imperfect, or in other words the layers of the product will be liable to separate. It is therefore importantly desirable to regulate the moisture content of the sheets in accordance with bonding requirements, or in other words to bring the sheets to a substantially predetermined moisture content most advantageous for perfect bonding under particular working conditions.

In conducting a process of making plural-ply paper on the illustrative machine, regulation or tempering of the moisture contents of the sheets or plies to be bonded may be obtained by subjecting the wet sheets, while on the carrying mediums which carry them from their respective arcs of vacuum formation, to independently controlled vacuum action in the chambers 30 and by adjusting the vacua in said chambers 30 so as to force substantially uniformly through the respective sheets such quantities of air as to carry off or expel sufficient moisture to bring the sheets respectively to desired condition. In general a condition of minimum moisture content for perfect bonding is considered desirable, as the quality of the paper is better if the bonding union be perfected at minimum moisture and it is otherwise advantageous to avoid any substantial amount of mosture in excess of that required for perfect bonding. According to requirements, the vacua maintained in the chambers 30 may be more or less than the vacua maintained for forming the sheets.

By this method, which exemplifies forcing regulated quantities of a moisture removing agent into or through the sheet, the important process step of tempering the sheets to substantially the desired moisture content is accomplished without mechanical compression, so as to preserve the full benefits of the fine formation obtained by the vacuum formation of the paper and to condition the paper most effectively to withstand ensuing pressure if applied in a succeeding portion of the machine. And by tempering the sheets by vacuum in the chambers 30, which may be controlled and adjusted independently of the forming vacuum maintained in the chambers 27, such tempering step may be practiced without limitation of speed or interference with the desired speed of rotation of the cylinders for the formation operation. In this connection it may be stated that a process embodying the present invention may be successfully practiced at substantially higher speeds than have ordinarily been practical or commercially available for the production of plural-ply paper.

A machine such as represented in Fig. 2, without the wires 12 and 13 and other superposed associated parts, may be used for duplexing purposes or making two ply paper on the suction rolls or cylinders 3 and 4. Like stock or different stock being supplied to the vats of these cylinders, continuous wet sheets or plies form on the endless wires 9 and 10 as they traverse the areas exposed to the vacuum action in the chambers 27, such sheets being relatively thin or thick according to the amount of vacuum maintained and the nature of the stock and working conditions. As the wires pass over the vacuum areas of the chambers 30, the sheets formed on the wires are tempered by the regulated vacuum action in said chambers to a desired moisture content for effective bonding purposes as previously explained. The sheets are then carried on the converging runs of the wires and brought together in this instance at the roll 15, beyond which the contacting sheets are carried between and with pressure applied by coacting runs of said wires between the rolls 15 and 16.

Such pressure applied on the contacting sheets by these coacting runs of the wires, deflected by the rolls 15 and 16 will in some cases be sufficient for bonding of the sheets together or for a partial bonding to be completed as the composite web composed of said sheets is carried through succeeding press section. If additional pressure is required for bonding, the rolls 15, which are rubber or rubber covered squeeze rolls, are adjusted to apply such pressure. The transfer roll 16 is a suction roll having its suction box or chamber arranged to act on the composite web as the web traverses said roll and thus transfer the web onto the wire 9, or to prevent said web from following the wire 10 around the roll 17. From the wire 9, the composite web is transferred by suction roll 33 onto a press felt 31. The felt 31 is shown passing through a press comprising a squeeze roll 35 and coacting suction roll 34, the vacuum chamber of which acts at the bite of the rolls. The felt at its delivery end is shown passing around a guide roll 36 and its return run is guided and tensioned by the rolls 37. A guide roll 32 is shown to guide the felt under the transfer roll 33. One or more press sections may be employed for smoothing purposes or for completing the bonding of sheets previously partially bonded between the coacting runs of the wires 9 and 10.

Assume for example that it is desired to make three ply paper. While the two plies are being made upon the suction rolls 3 and 4, a third ply may be made upon any of the other cylinders, for instance either of the cylinders 5 and 6, no stock being applied to the cylinders on which no sheets are to be formed. If for example the third ply is made on the suction roll 5, the sheet or ply forms continuously on the wire 11 under vacuum action and is tempered as to moisture content as before explained, and is carried by said wire and beyond the roll 19 by the coacting runs of the wires 11 and 12 to the transfer roll 20, which is a suction roll having its suction chamber disposed to suck the sheet onto the wire 12. The wire 12 then conveys the sheet in engagement with the sheet on the suction roll 3. It will be noted that the wire 12 is trained in engagement with the suction roll 3 at about the point where the wire cloth on the roll 3 is about to leave the area subjected to vacuum action in the chamber 30, so that the vacuum in said chamber 30, in addition to its function of tempering the sheet formed on the roll 3, also serves to suck or transfer onto the wire 9 or sheet carried thereon the sheet delivered by the wire 12.

If wet sheets are simultaneously made and tempered on both of the upper suction rolls 5 and 6, as for instance in making four ply paper by said rolls in conjunction with the rolls 3 and 4, the sheets formed on said rolls 5 and 6 are carried by the converging runs of the wires past the roll 19 and then by the coacting runs of the wires with the pressure exerted thereby which, as before indicated, may according to conditions suffice for bonding and partial bonding of said sheets, while additional pressure may be applied for bonding by adjusting the rolls 19 to exert such pressure, said rolls 19 like the rolls 15 being rubber squeeze rolls. The composite web formed of the sheets or plies made on the suction rolls 5 and 6 is transferred by the suction roll 20 onto the wire 12 and delivered to the sheet made on the suction roll 3, being transferred thereto at 30 as aforesaid, and is conveyed by the wire 9 for mergence and bonding with the sheet on the wire 10 as will be understood. In the same manner the suction rolls 7 and 8 may be used for making an additional ply or plies, tempering their moisture contents and delivering them through the agency of the suction transfer roll 20 and wire 13 and vacuum chamber 30 to the sheet made on the roll 4; while other variations in practice may be employed as will be obvious and if desired sheets formed and merged on still other suction rolls may be applied to either of the rolls 5, 6, 7 and 8 in the manner indicated with reference to application of sheets to the rolls 3 and 4.

Thus in the illustrative machine a number of continuous paper sheets or plies, regardless of the cylinders on which they are formed, are tempered as to moisture content and successfully brought into contact with one another and ultimately all together between the converging wires 9 and 10 entrained upon the lower cylinders 3 and 4. As the sheets are delivered one to another they adhere or bond together partially and between the wires 9 and 10 they may be pressed together by the pressure applied by the coacting runs of said wires below the roll 15 about which said wires are deflected, or by additional pressure if necessary applied for instance by adjustment of the squeeze rolls 15, thereby bonding the sheets together or effecting a partial bonding which is completed in ensuing press section or sections of the machine.

Referring to certain details of the illustrative machine, in Fig. 1 the cylinders of each of the upper pairs of suction rolls are shown driven by intermeshing gears 38 from a gear 39 meshing with one of such gears 38; while the lower cylinders 3 and 4 which are shown spaced further apart to accommodate the guide rolls 22 are shown each driven by gear 40 from gear 41. The suction rolls are preferably mounted in anti-friction bearings (not shown) to reduce the power required to rotate the cylinders and facilitate high speed operation. The endless wire cloth members are respectively driven by their respective cylinders and guided and tensioned by the various rolls shown.

In Fig. 2 in which the lower part of the illustrative machine is represented, the squeeze rolls 15, guide or tensioning rolls 18, suction transfer-rolls 16 and 33 and other parts, are shown adjustably mounted in suitable bearing members on a supporting frame 42, the latter being fragmentarily indicated and the superstructural parts thereof being omitted for the purpose of clearer illustration.

It will be understood that the forming vacuum chambers, tempering or moisture-regulative vacuum chambers and suction boxes of the illustrative machine may be connected with any suitable vacuum pumps or apparatus capable of maintaining the desired vacua in each. For instance, the vacuum chambers 30 may be connected with a positive rotary pump or pumps of the type shown in the Millspaugh Patent No. 1,025,822, dated May 7, 1912, for maintaining a substantially constant or uninterrupted vacuum while the larger vacuum chambers 27 may be connected with similar pumping apparatus of requisite capacity for handling the large volumes of water drawn from the vats. The widths of the vacuum exposed areas of the cylindrical forming surfaces and the vacuum boxes or chambers within the respective cylinders, may advantageously be correspondingly controlled by means similar to that shown and described in my co-pending application, Serial No. 610,538 filed January 3, 1923, for paper making methods and machines, although other means may be employed for accomplishing the same purpose.

Obviously the present invention is not limited to the specific details of construction, arrangement and mode of operation herein shown and described, since the same may be modified to meet different requirements and conditions; moreover it is not indispensable that all of the features of the invention be used conjointly, since they may advantageously be used in different combinations and sub-combinations.

It will be understood that the machine shown in Fig. 2 may be used for making a single ply sheet or a two ply sheet, or said machine may be used with other means, for instance the superposed devices shown in connection therewith in Fig. 1.

Notice is given of my prior and now pending application Serial No. 610,539, filed January 3, 1923, based upon a process and machine involving continuous vacuum induced formation of a wet paper sheet on an area of a rotating cylinder exposed to vacuum action against liquid stock; and of my prior and now pending application Serial No. 610,538, filed January 3, 1923, based upon a similar process and machine involving vacuum induced formation of the sheet on an endless wire traveling around the vacuum cylinder and also involving the simultaneous formation of sheets on oppositely revolving vacuum cylinders and bonding them to form a unitary plural-ply sheet; in which prior applications I claim more broadly certain subjects-matter embodied in the disclosure of this application.

What I claim is:

1. A method of making plural-ply paper in a continuous sheet characterized by simultaneously forming the several continuous plies thereof while reducing the moisture content of such plies without mechanical compression until the plies are brought substantially to the moisture content most advantageous for effective bonding, and then bringing the plies into relationship to form such plural-ply sheet while bonding the plies at substantially such determined moisture content.

2. A method of making plural-ply paper in a continuous sheet characterized by simultaneously forming the several continuous plies thereof by vacuum induced formation while extracting moisture from the plies by independent vacuum action and regulating such vacuum action to temper the plies to a proper moisture content for effective bonding, and bonding the plies together at substantially such moisture content while bringing them into relationship to form such plural-ply sheet.

3. A method of making plural-ply paper in a continuous sheet characterized by simultaneously forming the several continuous plies thereof while reducing the moisture content of the plies to substantially the minimum moisture content for effective bonding, and bonding the plies at substantially said minimum moisture content while bringing them into relationship to form such plural-ply sheet.

4. A method of making plural-ply paper in a continuous web characterized by simultaneously forming the several continuous plies thereof by vacuum-induced formation and carrying the several plies from their respective forming areas while subjecting the separate carrying mediums for said plies to vacuum; then reducing the moisture content of the several plies by vacuum to substantially the point most advantageous for effective bonding before subjecting the plies to mechanical compression; and then bringing the plies into relationship to form such plural-ply web and bonding the plies at substantially such determined moisture content.

5. A paper-making method characterized by simultaneously making a plurality of continuous wet paper plies by vacuum-induced formation and vacuum-induced moisture reduction on rotating cylinders, while regulating the moisture-reduction to temper the plies to a proper moisture content for good bonding, and bringing the plies into contact with one another and bonding them at such moisture content to form a unitary continuous sheet.

6. A paper-making method characterized by continuous vacuum-induced formation of a plurality of wet sheets while continuously conveying the sheets on rotating cylinders from their places of formation on endless mediums, and subjecting said sheets on said mediums to vacuum action regulated to temper the moisture contents of the sheets to a desired degree for bonding, carrying the plies by said mediums into contact with one another without subjecting them to mechanical compression before bringing them into contact, and bonding such contacting sheets at substantially the moisture content determined by such regulated vacuum action to make plural-ply paper.

7. A paper-making method characterized by simultaneously forming a plurality of continuous wet paper plies on a corresponding number of endless mediums, while carrying the respective mediums over rotating cylinders and maintaining segments of said cylinders traversed by said mediums and plies thereon under action of vacuum and regulating such vacuum to temper the plies to a proper moisture content for good bonding, and bringing the plies into contact one with another and bonding them at such moisture content to produce a unitary continuous sheet.

8. A paper-making method characterized by simultaneously forming a plurality of continuous wet paper plies on a corresponding number of endless mediums by vacuum-induced formation on said mediums over suction rolls having areas exposed to vacuum action against liquid containing the fibres from which the plies are formed, and carrying said plies by said mediums into contact one with another and bonding the contacting plies.

9. A paper-making method characterized by continuous vacuum-induced formation of a plurality of wet sheets while continuously conveying the sheets on suction rolls from their places of formation on endless mediums, and subjecting the sheets on said mediums to vacuum action regulated to temper the sheets to a proper low moisture content for good bonding, and bringing a plurality of such sheets into contact on a said medium and transferring said contacting sheets from said medium by suction.

10. A method of making cross-grain laminated paper characterized by simultaneously forming continuous plies thereof on cylindric surfaces exposed to vacuum action, while agitating the liquid stock bearing on certain of said surfaces in a given direction and that bearing on other of said surfaces in an opposite direction; tempering the moisture content of such sheets; and bonding such sheets together.

11. A method of making plural-ply paper characterized by simultaneously forming a plurality of continuous wet plies by vacuum-induced formation, while causing the liquid stock from which certain of said plies form to flow transversely of the sheet in one direction, and causing the liquid stock from which certain other of said plies form to flow transversely of the sheet in the opposite direction; and bringing together and bonding said plies as a continuous plural-ply web.

12. A paper-making process characterized by maintaining liquid stock on a segment of continuously moving cylindric surface; maintaining said surface under action of suitable vacuum to cause the continuous deposition and firm holding and compacting of paper stock fibres in a uniform sheet on said surface as it traverses the arc of contact with the liquid and to hold the formation intact as the sheet passes through and from the liquid; and maintaining said stock agitated in a manner to cause the stock to flow across the forming surface.

13. A paper-making machine comprising, in combination, a pair of oppositely rotating suction rolls; endless cloths entrained on and providing sheet forming surfaces on said suction rolls; means for maintaining liquid stock on segments of the cylindric forming surfaces provided by said cloths as they travel on said suction rolls; means associated with said suction rolls for subjecting said forming surfaces uninterruptedly to vacuum action while traversing the arcs of contact with said liquid stock; said endless cloths having converging sheet carrying runs which bring the sheets thereon into contact one with another.

14. A paper-making machine comprising, in combination, a pair of oppositely rotating suction rolls; endless cloths entrained on and providing sheet forming surfaces on said suction rolls; means for maintaining liquid stock on segments of the cylindric forming surfaces provided by said cloths as they travel on said suction rolls; means associated with said suction rolls for subjecting said forming surfaces uninterruptedly to vacuum action while traversing the arcs of contact with said liquid stock; said endless cloths having converging sheet carrying runs which bring the sheets thereon into contact one with another; a suction roll engaged by co-acting runs of said cloths, said last mentioned suction roll serving to transfer the contacting sheets to the cloth immediately next to said suction roll; and guide means whereby the other cloth passes beyond said last mentioned suction roll.

15. A paper-making machine comprising, in combination, a pair of oppositely rotating suction rolls; endless cloths entrained on and providing sheet forming surfaces on said suction rolls; means for maintaining liquid stock on segments of the cylindric forming surfaces provided by said cloths as they travel on said suction rolls; means associated with said suction rolls for subjecting said forming surfaces uninterruptedly to vacuum action while traversing the arcs of contact with said liquid stock; said endless cloths having converging sheet carrying runs which bring the sheets thereon into contact one with another; rolls around which said cloths return, one of which is a suction roll engaged by coacting runs of the cloths and which serves to transfer the contacting sheets to the cloth turning around said suction roll; an endless carrier associated with the return run of said last mentioned cloth; and a suction roll engaged by said endless carrier and cloth transferring the sheet to said endless carrier.

16. A paper-making machine comprising, in combination, a plurality of suction rolls having means to hold liquid stock on the vacuum areas thereof, endless members traveling around said rolls thereon providing sheet-forming surfaces on which continuous wet sheets are formed by vacuum-induced formation; and means for extracting moisture from the sheets while on said members by vacuum action regulated to temper the moisture content for effectual bonding; the machine being organized and arranged for bringing the tempered sheets together and bonding them into a plural-ply sheet.

17. A paper-making machine comprising, in combination means including oppositely rotating suction rolls for forming continuous wet sheets by vacuum-induced formation; other sheet-forming means effecting formation by vacuum; said other means arranged to deliver the sheet or sheets formed thereby between the sheets formed by the first-named means; and means for bonding the several sheets into a plural-ply sheet.

18. A paper-making machine comprising a plurality of means including suction-rolls for forming continuous wet sheets by vacuum-induced formation, said means arranged in groups organized and arranged to bring pairs of individual sheets together and to bring the pairs together and bond them into a plural-ply sheet.

19. A paper-making machine comprising, in combination, a plurality of continuously moving surfaces on which wet sheets are simultaneously formed; means for subjecting the sheets while on said surfaces to regulated vacuum action to temper the sheets to a predetermined moisture content for bonding; and means for carrying the sheets formed on certain of said surfaces in contact with sheets formed on certain other of said surfaces.

20. A paper-making machine comprising, in combination, a plurality of rotating cylinders having vacuum areas on which continuous wet sheets are simultaneously formed; means for tempering the sheets while on said cylinders to a desired moisture content for bonding; and means for merging the sheets formed on certain of said cylinders and carrying the merged sheets in merging contact with sheets formed on certain other of said cylinders.

21. A paper-making machine comprising, in combination, a plurality of rotating cylinders having vacuum areas and overlying endless traveling members providing sheet forming surfaces on which wet sheets of paper are simultaneously and continuously formed; means for tempering the sheets to predetermined moisture contents; means for merging the tempered sheets to effect bonding therebetween; and means for transferring the merged sheets by suction from one forming surface to another.

22. A paper-making machine comprising, in combination, means for forming continuous wet sheets by vacuum-induced formation; means for tempering the moisture contents of the sheets by vacuum; and means for transferring sheet to sheet by suction.

23. A paper-making machine having, in combination, a paper-forming suction roll; other means for forming a wet sheet, including means for carrying the same into contact with the sheet made on said suction roll; and suction means in said suction roll for transferring the wet sheet made by said other means to that made on said suction roll.

24. A paper-making machine having, in combination, a paper-forming suction roll; other means for forming a wet sheet, including means for carrying the same into contact with the sheet made on said suction roll; and an independent vacuum chamber in said suction roll operating to force air for moisture reducing purposes through the sheet made on said suction roll while sucking thereonto the wet sheet from said carrying means.

25. A paper-making machine comprising, in combination, means including a plurality of suction-rolls for forming continuous wet sheets and bringing them together in a plural-ply sheet; said machine including in its organization endless means carrying said plural-ply sheet and a suction roll for transferring the plural-ply sheet from said endless means.

26. A paper-making machine comprising, in combination, means including a plurality of suction-rolls for forming continuous wet sheets and bringing them together in a plural-ply sheet; said machine including in its organization endless means carrying said plural-ply sheet; endless carrying means to which the plural-ply sheet is delivered from said first named endless means; and suction means for transferring the web from one to another of said endless means.

27. A paper-making machine comprising a plurality of suction rolls and endless cloths traveling around said rolls, with associated liquid stock holding and vacuum applying means for forming continuous wet sheets on said cloths while traveling on said suction rolls; the machine being organized and arranged for bringing said sheets into contact with one another and bonding them together to form a plural-ply sheet.

28. A paper-making machine comprising a plurality of suction rolls and associated means for forming a plurality of continuous wet sheets under influence of vacuum action; said means including endless cloths passing around and providing the sheet forming surfaces on said suction rolls and arranged to bring the sheets successively into contact one with another.

29. A paper-making machine comprising a plurality of suction rolls and associated means for forming a plurality of continuous wet sheets under influence of vacuum action, including endless cloths passing around and providing the sheet forming surfaces on said rolls, in combination with suction means for transferring sheets from cloth to cloth.

30. A paper-making machine comprising a plurality of suction rolls and associated means for forming a plurality of continuous wet sheets under influence of vacuum action, including endless cloths passing around and providing the sheet forming surfaces on said rolls, certain of said suction rolls having suction means for transferring a sheet from an adjacent cloth to the cloth on the suction roll referred to.

31. A paper-making machine having, in combination, a cylinder; an endless cloth passing around said cylinder on which a wet sheet is formed; a cooperating endless cloth carrying a wet sheet, with associated means for forming the wet sheet carried by said cooperating cloth; said cooperating cloth engaging the first mentioned cloth on said cylinder; and suction means in said cylinder for transferring the sheet from said cooperating cloth into contact with that on the first mentioned cloth.

32. A paper-making machine having, in combination, a cylinder; an endless cloth passing around said cylinder on which a wet sheet is formed; a cooperating endless cloth carrying a wet sheet, with associated means for forming the wet sheet carried by said cooperating cloth; said cooperating cloth engaging the first mentioned cloth on said cylinder; said cylinder having a vacuum chamber exerting vacuum action on the sheet thereon to extract moisture from said sheet while also performing the function of withdrawing the sheet from said cooperating cloth onto the sheet carried by said first mentioned cloth.

33. A paper-making machine having, in combination, a paper-forming suction roll; means for holding liquid stock thereto; and means agitating said liquid stock to flow transversely of the forming surface of the suction roll.

34. A paper-making machine having, in combination, a paper-forming suction roll; means for holding liquid stock thereto; and a rotary screw or spiral-bladed agitator operating in said liquid stock and arranged longitudinally of the roll.

35. A paper-making machine having, in combination, a paper-forming suction roll; means for holding liquid stock thereto; and a plurality of rotary screw agitators operating on the liquid beside the suction roll.

36. A paper-making machine comprising suction rolls and wires running around them on which wet sheets are formed over the rolls by vacuum-induced formation, the machine organized and arranged for bringing the respective wet sheets into contact and bonding them together in a plural-ply sheet and embodying means for carrying off said plural-ply sheet.

37. A paper-making machine comprising suction rolls and wires running around them on which wet sheets are formed over the rolls by vacuum-induced formation, and having means by which the respective sheets formed on said wires are subjected to independent vacuum action for reducing the moisture content of the sheets, the machine being organized and arranged for carrying the sheets into contact after such moisture reducing action and bonding them together in a plural-ply sheet.

38. A paper-making machine comprising a pair of oppositely rotating suction rolls and wires running around them on which wet sheets are formed over the rolls by vacuum-induced formation, said wires having their off-bearing runs arranged to carry their respective sheets into contact and one of said wires adapted to carry off the contacting sheets from the other wire.

39. A paper-making machine comprising suction rolls and wires running around them on which wet sheets are formed over the rolls by vacuum-induced formation, there being a pair of said rolls and wires with converging off-bearing runs, and there being at least one other roll and wire arranged to carry its sheet into contact with the wire on one of said pair of rolls.

40. A paper-making machine comprising suction rolls and wires running around them on which wet sheets are formed over the rolls by vacuum-induced formation, one of said wires carrying its sheet into contact with the sheet on another wire and the latter carrying the contacting sheets off from the first mentioned wire and into contact with the sheet on a third wire which carries off the several contacting sheets.

41. A paper-making machine comprising suction rolls and wires running around them on which wet sheets are formed over the rolls by vacuum-induced formation, there being a plurality of pairs of said rolls and wires with their off-bearing runs arranged to carry the sheets thereon into contact, one wire of each of certain pairs adapted to carrying the contacting sheets off from the other wire of such pair and to carry the same into contact with the sheet on a wire of another pair.

42. A paper-making machine comprising at least three suction rolls and wires running around them on which wet sheets are formed over the rolls by vacuum-induced formation, said wires arranged to carry the respective wet sheets into contact with one another for bonding to form a plural-ply sheet.

43. A paper-making machine comprising, in combination, a pair of oppositely rotating suction rolls; wires traveling around said suction rolls and traversing the vacuum areas thereof; means to hold pulp liquid on said vacuum areas; said wires having their off-bearing runs arranged to carry the wet sheets thereon into contact for bonding them into a plural-ply sheet; means for subjecting the sheets on said wires before they are brought into contact to independent vacuum action for reducing the moisture content of the sheets before bonding; and means to receive and carry off the plural-ply sheet composed of the contacting sheets.

44. A paper-making machine comprising a pair of oppositely rotating suction rolls; wires traveling around and from said suction rolls; means to hold pulp liquid on the vacuum areas of said rolls; said wires having downwardly extending and converging off-bearing runs to bring the respective wet sheets formed on the wires into contact with one another; a suction device traversed by said wires to transfer the contacting sheets from one of said wires to the other; a press felt; and a suction device traversed by said other wire and felt to transfer the contacting sheets to the felt.

45. A paper-making machine comprising, in combination, a suction roll; a wire traveling around said suction roll and covering the vacuum area thereof; means to hold pulp liquid on said vacuum area; a press felt; and a suction device traversed by the wire and felt for transferring the sheet formed on the wire to said felt.

46. A paper-making machine comprising a pair of oppositely rotating suction rolls and wires running around them on which wet sheets are formed over the rolls by vacuum-induced formation, the arrangement being such that the off-bearing sheet-carrying runs of the wires travel downwardly from confronting sides of the rolls, and said wires having their off-bearing runs arranged to carry their respective sheets into contact and one of said wires adapted to carry off the contacting sheets from the other wire.

In testimony whereof I affix my signature.

WILLIAM H. MILLSPAUGH.